Sept. 12, 1967  J. KEYES  3,340,813
CENTRIFUGAL PUMPS
Filed June 11, 1965
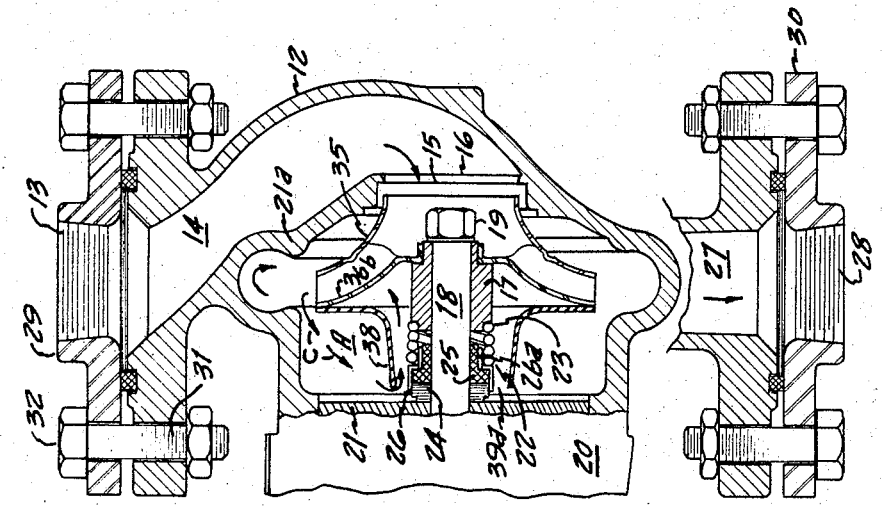
FIG. 1
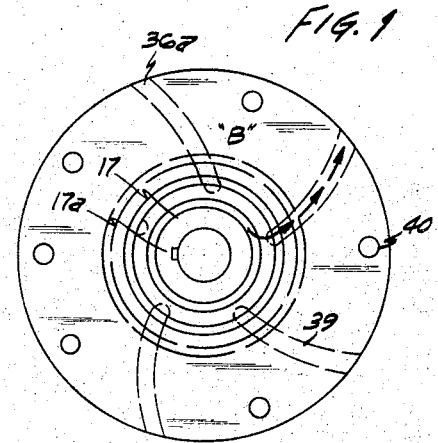
FIG. 3
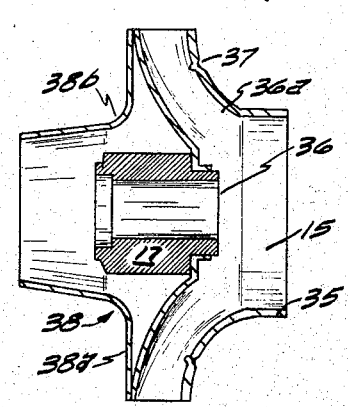
FIG. 2
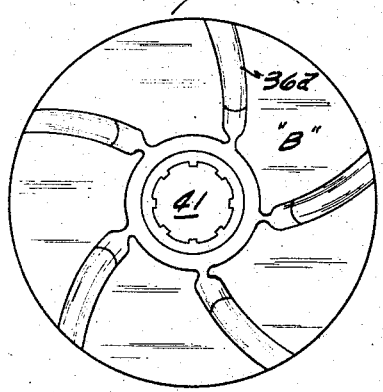
FIG. 5
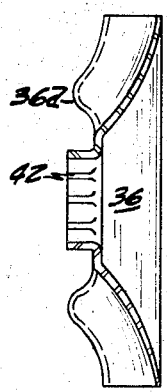
FIG. 4
FIG. 3a
INVENTOR.
JACK KEYES
BY
ATTORNEY

United States Patent Office 3,340,813
Patented Sept. 12, 1967

3,340,813
CENTRIFUGAL PUMPS
Jack Keyes, Glencoe, Ill., assignor to International
Telephone and Telegraph Corporation
Filed June 11, 1965, Ser. No. 463,259
8 Claims. (Cl. 103—111)

ABSTRACT OF THE DISCLOSURE

The seals of small centrifugal booster pumps tend to be surrounded by the gas entrapped in the liquid being pumped rather than by the liquid. Hence, the seal is not properly lubricated. Applicant uses an impeller having a rear shroud for assuring that the liquid rather than entrapped gases is pumped over the seal to reduce friction and conduct away generated heat.

This invention relates in general to centrifugal pumps and in particular to pump drive shaft seal lubricating and heat transfer arrangements.

Properly lubricating and disposing of the heat generated by pump drive shaft seals has always been a problem effecting the reliability and longevity of centrifugal pumps. The lubrication and related heat disposal problem is especially severe in the relatively small high velocity domestic hot water systems presently on the market. In the single eye impeller type centrifugal pumps usually used in these domestic systems, there is a tendency for the entrained gases to collect around the seal surfaces due to the centrifugal and centripetal action of the pump on the liquid and gases being pumped. Accordingly, the action of the pump causes a pressure gradient in the seal cavity. The pressure is a maximum at the outer periphery of the impeller and a minimum at the pump drive shaft. More specifically, the relatively low mass of the gases passing through the pump in the liquid causes the gases to move to the low pressure area out of the liquid stream; while the liquid, because of its relatively high mass, tends to move toward the outer periphery of the impeller.

As a result of these tendencies, the pump seal is surrounded by gas rather than the liquid being pumped and hence, the pump runs without proper lubrication and with no efficient heat conductor contiguous to the pump drive shaft seal.

In the past, special baffle plates and baffle ribs have been used in an effort to cause the liquid to displace the gas and thus to lubricate the seal and carry away the heat generated at the seal. These baffles have in many cases not proven an adequate solution; since, among other reasons, the baffle plates do not positively insure a constant flow of new liquid past the seals.

Accordingly, an object of the present invention is to provide a new and unique means for preventing failure of the seals in centrifugal pumps due to overheating.

More specifically, it is an object of this invention to provide a means for ascertaining that the seals are properly lubricated.

A related object of this invention is to provide positive and continuous flow of fluid through the seal cavity and contiguous to the seal itself.

Yet another object of the invention is to prevent the formation of gaseous insulating pockets around the drive shaft seal.

In accordance with one preferred embodiment of the invention a rear shroud is fixedly mounted on the impeller assembly of a centrifugal pump in a way such that the liquid and gas mixture are not separated in the seal cavity but are positively pumped over the seal surfaces. Thus, the seal is lubricated at all times and the generated heat is removed. Consequently, the inventive pump drive shaft seal arangement makes possible pumps that are quieter and longer lived than pumps that use the presently available drive shaft sealing arrangements.

The above mentioned and other objects and features of the invention will become apparent during the course of the following description of the drawing made in conjunction with the following drawings, wherein:

FIG. 1 is a sectional view taken through a single eye impeller type centrifugal pump;

FIG. 2 is a sectional view of the impeller of the invention showing both the front and rear shrouds;

FIG. 3 is a face view of the impeller assembly of FIG. 2;

FIG. 3a is a section view showing the passageway formed by the rear of the impeller blade and the rear shroud;

FIG. 4 is a sectional view of the impeller blade without the shrouds; and

FIG. 5 is the face view of the impeller of FIG. 4 and the rear shroud to form a passageway.

When possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. For example, the drawing shows a horizontal pump providing pumped fluid flow contiguous to the drive shaft seal, however, the inventive means for providing fluid flow over the seal is equally amenable to vertical pumps.

Thus, for purposes of illustrative disclosure a single eye impeller volute type centrifugal pump is shown in FIG. 1 and designated generally as 11. The pump includes a casing 12 having a suction inlet 13 properly threaded for connecting the pump to a fluid source (not shown). The inlet 13 is hydraulically coupled to the eye 15 of impeller assembly 16 by suction passage 14. The impeller assembly 16 includes hub 17 which is keyed to a rotatable drive shaft 18 and secured to that drive shaft by any well known means such as threaded nut 19. The drive shaft is turned by any motivating means such as an electric motor (not shown). The pump is supported and coupled to the motor by any well known means, such as motor support and coupling bracket 20 shown in block diagram form.

The drive shaft 18 extends through the seal plate 21 which is the back wall of the volute casing 12. The volute casing is shaped to provide a seal cavity A. A conventional seal assembly 22 keeps the fluid being pumped from leaking through the opening provided in the seal plate 21 for the drive shaft 18. The seal assembly comprises seal spring 23 which is secured around a ridge on hub 17. The coil spring 23 being in a compressed condition exerts a force against seal ring 24 which is attached to rotate with the shaft 18. To minimize wear on the seal ring 24 that would normally be caused by spring 23, a boot 25 fits against the seal ring 24 between the spring and the seal ring. A two piece retainer 26, 26a encompasses the boot 25. A stationary ring (not shown) may be inserted into the seal plate 21.

In one preferred embodiment of the invention, the seal ring 24 is made of a carbon composition while the stationary ring is made of a ceramic material. However, any materials useful for sealing purposes and minimizing function may be used.

The impeller assembly 16 of this invention draws the fluid being pumped through the suction passage 14, the eye 15, and forces it out through the discharge passage 27 and discharge outlet 28. The discharge outlet is coupled to the pipes of the hydraulic system.

The suction inlet and the discharge outlet of the illustrated embodiment are integral parts of plates 29, 30 respectively. Thus, the plates which are coupled to the volute casing 12 using fasteners such as the nut and bolt 31, 32 respectively, can be easily changed to provide either different size pipe threaded openings or even tube coupling means so that the pump can be readily connected to either a tube system or different sized pipe systems merely by changing the plates.

The impeller assembly, as best shown in FIGS. 2 and 3, is comprised of a front shroud 35 permanently attached to the blades, such as blade 36a of impeller 36 by any well known means. In the illustrated impeller assembly the front shroud 35 is spot welded to the blades along ridge 37 which may be formed into the shroud when it is fabricated. The front shroud 35 is shaped to fit into the eye 15 formed by the seal plate wall structure 21a (FIG. 1). The fluid coming into the eye is forced to travel over space B between the front shroud and the impeller blades, connected by web 36b.

The impeller assembly also includes the hub 17 having key slot 17a for rotatably fastening the impeller assembly 38 to the drive shaft. It should be understood that any other suitable means may be used for fastening the impeller assembly to the drive shaft.

A rear shroud 38 is also attached to the impeller blades by means such as spot welding. One section 38a of the rear shroud is juxtaposed to and encloses the rear of the impeller blade 36 so as to form a fluid passageway 39. Another section 38b of the rear shroud 38 surrounds the seal assembly at a definite distance removed therefrom to form a fluid passageway 39a. The fluid in the seal cavity is circulated through passageway 39a, contiguously to the seal and then pumped through passageway 39 (as indicated by arrows c in FIGS. 2 and 3) to the volute discharge passage 27. The rear shroud 38 is designed to insure that the fluid in the seal cavity is forced to pass immediately over the seal so as to lubricate the seal and at a sufficient velocity to carry along any gases which may have gathered around the seal assembly and drive shaft. The pump liquid of passage 39a also acts to remove heat generated by the friction between seal 24 and insert 26.

The circles 40 on the rear shroud represent small projections which are an integral part of the rear shroud and are used in welding the rear shroud to the blades.

FIG. 4 shows a cross section of the impeller 36 without either the front or the rear shroud. The hub of the impeller is a circular hole having splines 42. The splines 42 act to aid in retaining the key slotted hub 17 when it is press fitted into hole 41. The impeller 36 is shown having five blades, such as blade 36a, equally spaced with the impeller. The pumping action occurs when the fluid trapped in area B between the blades is pushed by the blades as the impeller rotates in the direction D. As the velocity of the entrapped fluid increases it is forced outward by centrifugal forces. When a rear shroud is not provided then only an insignificant amount of fluid is pumped through passageway 39. Thus, there is relatively no pumping action on the fluid that leaks into cavity A to force it to overcome the aforementioned pressure gradient and come into contact with the shaft seal. The rear shroud 38 cooperates with the fold at the back of blade 36a to form passageway 39 and extends over virtually the entire seal assembly to form passageway 39a. The rear shroud causes the rear of the impeller blade to provide an additional pumping action which not only causes the fluid to come into contact with the seal but in addition, causes this contact to be a flowing contact whereby the fluid of the seal cavity is circulated within the cavity and forced to flow out of the cavity to mix with the main body of the fluid in the discharge passage of the volute casing. Forcing the fluid from the seal cavity in this manner ensures proper lubrication and heat transfer and also improves the pump characteristics by adding the velocity head of the fluid passing through passageway 39 to the main body of fluid in the discharge passage.

In operation the fluid in the system, regardless of whether it is a cooling system or a heating system, is drawn into suction inlet 13 when the motor coupled to the drive shaft 18 causes the impeller assembly to rotate. The fluid passes through suction passage 14 and the eye 15 of the seal plate wall structure 21a. When passing through the eye 15 the fluid is trapped between the two blades 36a and area B of the impeller 36. The trapped fluid gains head due to the centrifugal force applied thereto by the rotation of the impeller. This forces the fluid through the discharge passage 27, the discharge outlet 28 and back into the hydraulic system.

Some fluid leaks past the impeller into the seal cavity A (as shown by arrows c). The amount of leakage fluid is governed by such things as the clearance between the impeller 36 and wall 21a. The leakage fluid is pulled first between rear shroud 38 and the seal plate 21 then between the rear shroud and the seal assembly 22 (passageway 39a) and finally through passageway 39, into the discharge passage. The velocity of the fluid in this secondary path is governed by such things as the clearance between the shroud 38 and the seal assembly. The rear shroud arrangement thus forces the flow of fluid over the seal assembly to properly lubricate the seal and remove the friction generated heat.

When no rear shroud is provided, the seal assembly is surrounded by escaped gases. Thus, due to the lack of lubrication between the rotating seal 24 and the stationary insert 26, friction between the seal and insert increases. The increased friction generates detrimental heat, causes excessive wear of the seal and consequently increased pump wear and down time as well as noisy operation of the pump.

The detrimental frictional effect on the pump is compounded since the gas heat insulates the pump and prevents the removal of the generated heat by conduction leaving only conventional processes to remove the heat. The structure described herein eliminates the detrimental friction problems and also improves the characteristics of the pump.

While the principles of the invention have been described above in connection with specific apparatus and applications, it is to be understood that this description is made only by way of example and not as a limitation on the scope of the invention.

I claim:

1. In a centrifugal pump, said pump including a casing having a liquid inlet leading to a suction passage and a pressure chamber leading to a liquid outlet, said casing having wall structure bordering and defining a seal cavity communicating with said pressure chamber, with said wall structure having a central shaft opening, a rotatable shaft projecting through said opening and seal cavity and carrying an impeller for rotation in said casing to draw liquid through said suction passage and discharge it into said pressure chamber, a seal assembly in said seal cavity including rotatable seal ring means encircling said shaft to provide a seal across said central shaft opening of said wall structure, and said impeller comprising rear shroud means for forming a passageway through which said liquid in said seal cavity is forcibly circulated contiguous to said seal ring means, said passageway extending over said seal assembly to the pressure chamber.

2. In a centrifugal pump, said pump including a casing having a liquid inlet leading to a suction passage and a pressure chamber leading to a liquid outlet, said casing having wall structure bordering and defining a seal cavity communicating with said pressure chamber, said wall structure having a central shaft opening, a rotatable shaft projecting through said opening and seal cavity and carrying an impeller for rotation in said casing to draw liquid through said suction passage and discharge it into said pressure chamber, a seal assembly in said seal cavity including rotatable seal ring means encircling said shaft to provide a seal across said central shaft opening of said wall structure, said impeller comprising rear shroud means overlying said seal assembly for forming a passageway through which said liquid in said seal cavity is forcibly circulated contiguous to said seal ring means, and said impeller having formed blades protruding on the front side of said impeller and forming channels on the rear side of said impeller, and wherein said rear shroud means is attached to the rear side of said impeller so that it cooperates with said channels for forming said passageway through which the liquid in said seal cavity is forcibly circulated.

3. In the centrifugal pump of claim 2 wherein said rear shroud extends to surround said seal assembly thereby forming a second passageway, means for connecting said second passageway to said first passageway for causing said liquid in said seal cavity to flow contiguously to said seal ring means.

4. A centrifugal pump having a drive shaft, seal means for said drive shaft, impeller means coupled to said shaft for pumping fluid, and said impeller means comprising rear shroud means overlying said drive shaft seal means for pumping leakage fluid over and in contact with said drive shaft seal.

5. A centrifugal pump having a drive shaft, seal means for said drive shaft, impeller means coupled to said shaft for pumping fluid, said impeller means comprising rear shroud means overlying said shaft seal means fixed to said impeller for positively pumping leakage fluid over and in contact with said drive shaft seal, said rear shroud having one section juxtaposed to the rear of said impeller forming first fluid passageways, said first passageways leading to the discharge chamber of said pump, another section of said rear shroud surrounding and juxtaposed to said seal means and forming a second passageway leading from seal cavity, said rear shroud and said impeller cooperating to join said first and second passageways whereby the liquid in said seal cavity is continuously pumped contiguously over said seal assembly to the pressure chamber of said pump.

6. In the pump of claim 5 wherein said rear shroud is shaped to cause the velocity of the liquid in said first and second passageways to be sufficient to entrap any escaped gases.

7. In the pump of claim 6 wherein said rear shroud comprises a first section juxtaposed to said impeller and a second section surrounding said shaft juxtaposed to said seal assembly.

8. In the pump of claim 7 wherein said impeller is formed with protruding blades on the front side and inverted channels on the rear side.

References Cited

UNITED STATES PATENTS

| | | | |
|---|---|---|---|
| 1,946,212 | 2/1934 | Jacobsen | 103—11 |
| 2,741,991 | 4/1956 | Disbrow | 103—111 |
| 2,835,203 | 5/1958 | Cliborn | 103—111 |
| 2,899,129 | 8/1959 | Schwaiger | 230—134 |
| 3,040,670 | 6/1962 | Schenck et al. | 103—111 |
| 3,059,582 | 10/1962 | Greene et al. | 103—87 |

FOREIGN PATENTS

| | | |
|---|---|---|
| 607,566 | 10/1960 | Canada. |
| 153,318 | 11/1920 | Great Britain. |
| 811,849 | 4/1959 | Great Britain. |

DONLEY J. STOCKING, *Primary Examiner.*

HENRY F. RADUAZO, ROBERT M. WALKER,
*Examiners.*